United States Patent [19]

Schatz et al.

[11] Patent Number: 5,165,467
[45] Date of Patent: Nov. 24, 1992

[54] HEAT STORAGE MEANS

[76] Inventors: Oskar Schatz, Waldpromenade 16, DW-8035 Gauting; Horst Marx, Tattenkofener Strasse 19, DW-8112 Geretsried, both of Fed. Rep. of Germany

[21] Appl. No.: 665,285

[22] Filed: Mar. 5, 1991

[51] Int. Cl.⁵ ............................................. F28D 20/00
[52] U.S. Cl. ...................................... 165/10; 165/41; 165/81; 220/86.1
[58] Field of Search ............................ 165/10, 41, 81; 220/85 F, 86.1

[56] References Cited

U.S. PATENT DOCUMENTS 2,722,336  11/1955  Wexler et al. ..................... 220/445
4,932,465   6/1990  Schatz ................................ 165/10

FOREIGN PATENT DOCUMENTS 3614318  10/1987  Fed. Rep. of Germany ........ 165/10

Primary Examiner—Albert W. Davis, Jr.
Attorney, Agent, or Firm—Harness, Dickey & Pierce

[57] ABSTRACT

A heat storage means with an inner container, an outer container surrounding the inner container with clearance and with the formation of a preferably evacuated insulating space has two ducts leading through the insulating space into the inner container, one of such ducts serving as a supply duct and the other serving as a return duct for a heat transport vehicle fluid. The duct sections passing through the insulating space pass from the lower side of the outer container through the insulating space as far as the upper part of the insulating space and then via a bend into the upper part of the inner container and the part, adjacent to the outer container and the bend of the duct sections are deformable and are preferably like bellows.

2 Claims, 1 Drawing Sheet

HEAT STORAGE MEANS

BACKGROUND OF THE INVENTION

The present invention relates to a heat storage means comprising an inner container with a storage core therein, an outer container surrounding the inner container with clearance and so as to form a preferably evacuated insulating space, two ducts running from the outside through the insulating space into the inner container, one of such ducts serving as a supply duct for a heat vehicle fluid and the other thereof serving as a return line for same, the duct sections passing through the insulating space having a straight section extending outwards through the outer container and an elbow opening into the inner container and adjoining the said section, the part, which is adjacent to the outer container, of the duct sections being made so deformable that both the length of the duct in the deformable part thereof and in the course thereof its longitudinal direction may be adjusted.

A heat storage means of this type is described in the German patent publication DE 3,725,165-A. In this known design a straight duct section extends from the outer container to the bend, which at its lower and its top ends has respective short, bellows-like sections.

This arrangement makes it possible to allow for inaccuracies in manufacture during fitting, it both being possible to change the length of the duct between the bend and the outer container and also, within certain limits, the longitudinal direction of the duct section located between the bellows-like sections. Furthermore, it is possible to allow for expansion due to thermal effects.

When there is little space available it is important to keep the dimensions of the heat storage means as small as possible. In the case of the design of the said German patent publication DE 3,725,165-A the gap between the outer container and inner container is comparatively large.

During assembly the inner container is introduced into the outer container and secured in its position. When this is done the inner container is so offset out of its final position intended in the outer container that the duct ends extending past the periphery of the inner container do not hinder the introduction of the inner container. As soon as these duct ends are aligned with the apertures, provided for them, in the outer container, the inner container is placed in its final position, the duct ends being pushed through the apertures in an outward direction. Then the inner container is secured in its position, following which the duct ends are connected in a sealing manner with the outer container.

It has turned out that the gap between the outer container and the inner container may be reduced down to a few millimeters, as for example down to 5 mm, without affecting the function of the insulating space. On the other hand for reasons of manufacturing technology, it is necessary to cause the return duct to extend further out of the outer container in order to produce a reliable sealing joint in a relatively simple manner.

The reduction in the space required made possible by reducing the gap for the heat storage means is restricted by the fact that then the inner container is not able to be shifted sufficiently out of its final position during assembly in order to be able to insert the ducts into the inner container.

SHORT SUMMARY OF THE PRESENT INVENTION

One object of the present invention is to be able to perform simple and reliable assembly even if the heat storage means has a small overall size.

In the case of the heat storage means of the initially described type this object is to be attained by designing the bends so that they as well may be deformed.

This makes it possible to connect the supply duct and the return duct at least while they are stretched to such an extent that the ducts, connected in a sealing manner with the inner container are not able to obstruct the insertion of the inner container into the outer container. When the inner container is fixed in its position in the outer container, the ducts may be bent downwards adjacent to the bends, and also displaced at the same time upwards to the degree required for the alignment with the apertures associated with them on the outer container. Once the ducts are aligned with the apertures, the ducts are pushed downwards through the apertures and the bends are thus brought into their final form, following which adjacent to the apertures the ducts are sealingly connected with the outer container.

The deformable design of the bend furthermore improves the ability of the ducts to take up thermally caused expansion during operation and to keep the container free of strains and vibrations.

The bend may be advantageously used as a replacement for the deformable section of the upper end of the duct part leading from below to the bend. However, it is particularly expedient that in the part adjacent to the bends, of the duct sections leading from the outer container to the bend, an equally deformable section is placed in conventional manner, and in a particularly convenient design the deformable part extends adjacent to the bends as far as the duct section, which connects the bend with the deformable part, which is adjacent to the outer container.

Preferably, the deformable sections are made like bellows.

The German patent publication 3,722,520 A describes a heat exchanger element in the form of a piece of corrugated hose, in the case of which the breadth of the valleys of the corrugations is larger than the crests therebetween in order to in this manner to achieve a minimum bend radius in the curved parts of the corrugated hose and thus to accommodate a maximum length of the hose in a given volume. The deformable design of an elbow, more particularly in the form of corrugations accordingly not intrinsically novel, but it has not be proposed for attaining the aim of the present invention. While in the case of the said German patent publication 3,722,520 the purpose is to have the maximum heat exchange surface, in the case of the heat storage means heat transfer in the vicinity of the duct connection extend through the insulating space this is highly undesirable, for which reason the duct surface is to be kept as small as possible more particularly owing to the radiation of heat if it is not possible owing to other advantages, as for instance the possibility of forming a barrier layer in the duct or a general reduction of the overall volume an increase in the area of the surface of the duct may prove acceptable.

Further features and advantages of the invention will be gathered from the ensuing description of an embodiment thereof referring to the drawings.

LIST OF THE SEVERAL VIEWS OF THE DRAWINGS

DETAILED DESCRIPTION OF WORKING EMBODIMENT OF THE INVENTION

Figure 1:
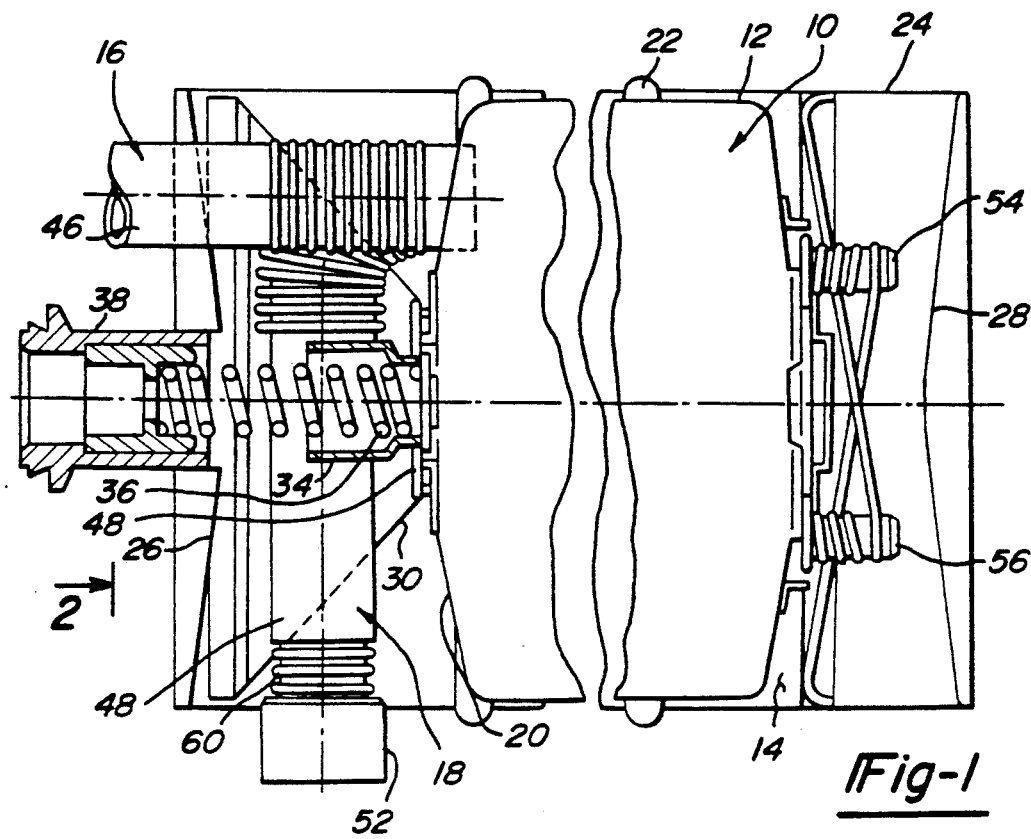
FIG. 1 is a longitudinal section through a heat storage means in accordance with the invention with a cylindrical housing form, the supply duct for the heat vehicle fluid being shown during fitting and the return duct being shown in the condition in its final position of assembly.
Figure 2:
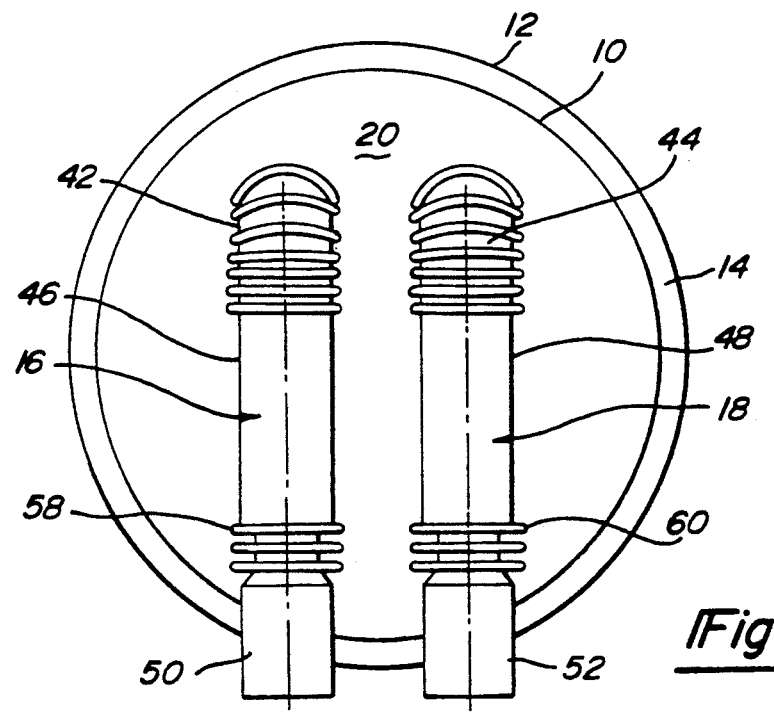
FIG. 2 is a diagrammatic view looking in the direction of the arrow II in FIG. 1 towards the end side of the inner container with ducts finally aligned and connected with the outer container and with the cover of the outer container removed.

The heat storage means illustrated consists of a circularly cylindrical inner container 10 and a circularly cylindrical outer container 12, between which an insulating space 14 is formed. A supply duct 16 and a return duct 18 are connected in the upper part of an end wall 20 of the inner container 10 to the latter and are arranged to extend through the insulating space 14 vertically downwards out of the outer container 12.

The outer container 12 consists of a cylindrical tubular casing 24 reinforced by grooves 22 and which is arranged so that there is a slight distance of the order of a few millimeters between it and the inner container 10 within it and two end walls 26 and 28 set in the tubular casing 24. A suspending element 30 is arranged adjacent to the left end wall 26 and is attached, for instance by welding. A further suspending element 32 is arranged adjacent to the right hand end wall 28 and is secured to the inner surface of the tubular casing 24 and via connection bolts 54 and 56 is connected with the inner container 10.

In the center of the left hand end wall 20 of the inner container 10 a guide sleeve 34 is mounted for a helical compression spring 36, such spring being arranged centered on the axis of the containers 10 and 12 between the inner container 10 and the outer container 12. The end wall 26, opposite to the end wall 20, of the outer container 12 also has a guide sleeve 38 for the compression spring 36, which is provided with an axially adjustable insert 40 for modifying the effective length of the compression spring 36.

In this arrangement the suspending element 30 primarily serves for axial alignment between the inner container 10 and the outer container 12, while the suspending element 32 serves primarily to set the radial distance between the two containers 10 and 12 and at the same time prevents twisting of the two containers 10 and 12 in relation to each other.

The supply duct 16 and the return duct 18 leave the end wall 20, in an at least approximately horizontal direction, of the inner container 10 and then each merge via a bend 42 and, respectively, 44 with a straight section 46 and, respectively, 48, which extends approximately vertically downwards and adjacent to apertures associated with the two ducts 16 and 18 passes through the outer container 12 in an outward direction and ends there in connection pipes 50 and, respectively, 52.

Adjacent to the bends 42 and 44 and in the parts 58 and 60 adjacent to the outer container 12 the ducts 16 and 18 are respectively in the form of bellows, the bellows-like section being continued adjacent to the bends 42 and 44 into and as far as the straight section 46 and, respectively, 48.

As the reader will see with reference to the supply duct 16 in FIG. 1, the ducts 16 and 18 are connected in a stretched state with the inner container so that the ducts 16 and 18 do not obstruct insertion of the inner container 10 in the outer container 12 despite the small clearance between the inner container and the outer container. After the fitting of the suspending elements 32 and 30 the inner container 10 is located in its ultimate position in relation to the outer container 12.

Then adjacent to the bends 42 and 44 the ducts 16 and 18 are on the one hand directed downwards and on the other hand are pushed upwards and, respectively, in the straight sections 46 and 48 by pressing together the bellows-like parts so that they are shortened axially to such an extent that the connection pipes 50 and 52 may be aligned with the apertures provided in the outer container 12 for the passage of the ducts 16 and 18. After this each of the bends 42 and 44 is moved into its final position shown in FIG. 1 with reference to the return duct 18 and the straight sections 46 and 48 are stretched to such an extent that the connections 50 and 52 assume their final position, after which the fluid-tight connection is produced between the connection pipes 50 and 52 and the outer container 12 and the outer container 12 is shut off by the end walls 26 and 28.

We claim:

1. A heat storage means comprising an inner container with a storage core therein, an outer container surrounding the inner container with clearance and so as to form an evacuated insulating space, two ducts running from the outside through the insulating space into the inner container, one of such ducts serving as a supply duct for a heat vehicle fluid and the other thereof serving as a return line for same, the duct sections passing through the insulating space having a straight section extending outwards through the outer container and an elbow opening into the inner container and adjoining said straight section, said straight and bent sections both being deformable and being adjustable such that the sections extend and contract along a longitudinal axis of the sections for enabling stretching and compressing of said sections to accommodate connection of said ducts and means for coupling said ducts with a connecting pipe, said coupling means integrally formed at a free end of the straight sections.

2. The container as in claim 1 wherein the deformable sections are designed like bellows.

* * * * *